(12) United States Patent
Ghabchi et al.

(10) Patent No.: US 9,144,841 B1
(45) Date of Patent: Sep. 29, 2015

(54) IN-MOLD METALLIZATION OF COMPOSITE STRUCTURES

(71) Applicant: The Boeing Company, Seal Beach, CA (US)

(72) Inventors: Arash Ghabchi, Seattle, WA (US); Alan Thompson, Seattle, WA (US); Marc J. Froning, Seattle, WA (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 13/678,525

(22) Filed: Nov. 15, 2012

(51) Int. Cl.
*B22D 23/00* (2006.01)

(52) U.S. Cl.
CPC .............. *B22D 23/003* (2013.01); *B22D 23/00* (2013.01)

(58) Field of Classification Search
CPC ............................. B22D 23/00; B22D 23/003
USPC ....................................................... 164/46, 19
See application file for complete search history.

(56) References Cited

U.S. PATENT DOCUMENTS

| | | | |
|---|---|---|---|
| 5,817,267 A * | 10/1998 | Covino et al. ............... | 264/219 |
| 6,478,875 B1 | 11/2002 | Sampath et al. | |
| 7,375,417 B2 | 5/2008 | Tran | |
| 7,578,451 B2 | 8/2009 | Mueller | |
| 7,959,983 B1 | 6/2011 | Farrar et al. | |
| 8,191,616 B2 | 6/2012 | Behrens et al. | |

FOREIGN PATENT DOCUMENTS

| | | |
|---|---|---|
| EP | 0117 838 | 9/1984 |
| GB | 20544 | 2/1981 |

OTHER PUBLICATIONS

CA 2827822, Canadian Office Action, dated Feb. 17, 2015.
EP13192582, Extended European Search Report, dated Feb. 124, 2014.

* cited by examiner

*Primary Examiner* — Kevin P Kerns (57) ABSTRACT

A method of forming a surface coating on a composite article may include applying a thermal spray to a tool surface of a tool in such a manner as to form a surface coating having a releasable bond with the tool surface. The method may further include applying composite material over the surface coating, curing the composite material to form a cured composite article, and removing the cured composite article from the tool in a manner that releases the surface coating from the tool surface and retains the surface coating with the cured composite article.

21 Claims, 8 Drawing Sheets

IN-MOLD METALLIZATION OF COMPOSITE STRUCTURES

FIELD

The present disclosure relates generally to metallic coatings and, more particularly, to a system and method for applying a surface coating to a composite article.

BACKGROUND

Composite structures are used in a wide variety of applications. In aircraft construction, composites are used in increasing quantities to form the fuselage, wings, and other components of an aircraft. During the operational life of an aircraft, the wings are exposed to a variety of environmental effects. For example, during flight when the aircraft is moving forward at high speed, the leading edge of the wings may be subjected to impingement by rain and other forms of moisture. In addition, the aircraft including the wings may be subjected to lightning strikes.

Conventional methods for protecting a composite leading edge from rain impingement include fastening a protective metallic strip over the leading edge. Unfortunately, the attachment of a metallic strip to a composite wing is a time-consuming and labor-intensive process requiring a large quantity of mechanical fasteners. The large quantity of fasteners may add to the overall weight of the aircraft. In addition, specialized tooling may be required for maintaining the position of the metallic strip during installation. Furthermore, fasteners that are installed through the outer mold line (OML) surface of the leading edge may disrupt the airflow passing over the OML surface. The disruption in airflow may cause the airflow over the wing to become turbulent with a resulting increase in aerodynamic drag and a corresponding reduction in aircraft fuel efficiency.

In addition, metallic material such as metallic sheet is generally formable into a single-curvature shape by bending the metallic sheet using relatively low-cost tooling. However, the leading edge of a wing may have one or more regions of compound curvature along the length of the leading edge. The process of forming a metallic erosion strip to match the compound curvature of a wing leading edge may require complex metal-forming equipment that may add to the overall cost and complexity of wing assembly.

Regarding protection from lightning strikes, composite materials generally have low electrical conductivity with limited ability to dissipate electrical energy from a lightning strike. Metallic sheeting mounted to the surface of a composite structure may provide some protection in the event of a lightning strike by dissipating electrical energy. Unfortunately, the mounting of metallic sheeting over the surface of a composite wing for lightning protection may involve the same drawbacks associated with mounting a metallic strip over the wing leading edge for erosion protection.

As can be seen, there exists a need in the art for a method of providing a metallic layer over a composite surface without the need to mechanically fasten a separate metallic sheet to the composite article. In addition, there exists a need in the art for a method of providing a metallic layer over a compound curvature surface that avoids the need for complex metal-forming equipment. Furthermore, there exists a need in the art for a method of providing a metallic layer that may protect a composite structure against the effects of erosion, lightning, and other effects.

SUMMARY

The above-noted needs associated with prior art methods for providing a metallic layer over a composite surface are specifically addressed and alleviated by the present disclosure which provides a method of forming a surface coating on a composite article. The method may include applying a thermal spray to a tool surface of a tool in such a manner as to form the surface coating with a releasable bond with the tool surface. The method may further include applying composite material over the surface coating, curing the composite material to form a cured composite article, and removing the cured composite article from the tool in a manner that releases the surface coating from the tool surface and retains the surface coating with the cured composite article.

In a further embodiment, disclosed is a method of in-mold metallization of a composite article. The method may include applying a first thermal spray to a tool surface of a tool in such a manner as to form a tool side coating portion having a releasable bond with the tool surface. The method may also include applying a second thermal spray to the tool side coating portion in such a manner as to form a part side coating portion being permanently bonded to the tool side coating portion. In addition, the method may include applying composite material over the part side coating portion, vacuum bagging the composite material, reducing a viscosity of resin in the composite material in a manner such that resin infuses with the part side coating portion, and curing the composite material at a predetermined temperature and a predetermined pressure to produce a cured composite article being permanently bonded to the part side coating portion. The method may further include debagging the cured composite article, and removing the cured composite article from the tool such that the tool side coating portion releases from the tool surface and is retained with the part side coating portion on the cured composite article The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
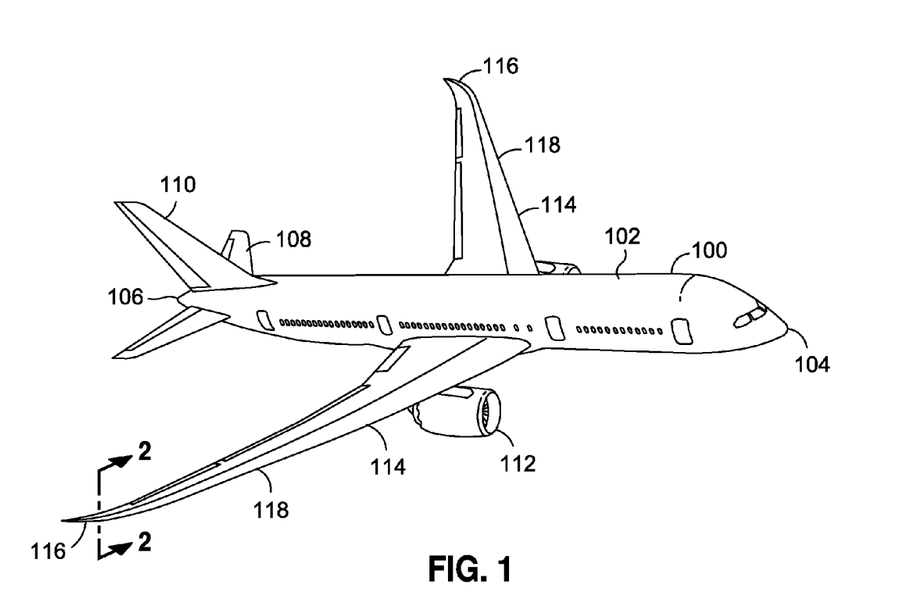
FIG. 1 is a perspective view of an aircraft.

Referring now to the drawings wherein the showings are for purposes of illustrating various embodiments of the present disclosure, shown in FIG. 1 is an aircraft 100 having a fuselage 102 extending from a nose 104 to an empennage 106 of the aircraft 100. The empennage 106 may include one or more tail surfaces such as a horizontal stabilizer 108, vertical stabilizer 110, and one or more movable control surfaces for directional control of the aircraft 100. The aircraft 100 may further include a pair of wings 114 each having a leading edge 118 and a trailing edge and optionally including a wing tip device 116. The aircraft 100 may further include one or more propulsion units 112 as may be mounted to the wings 114.

Figure 2:
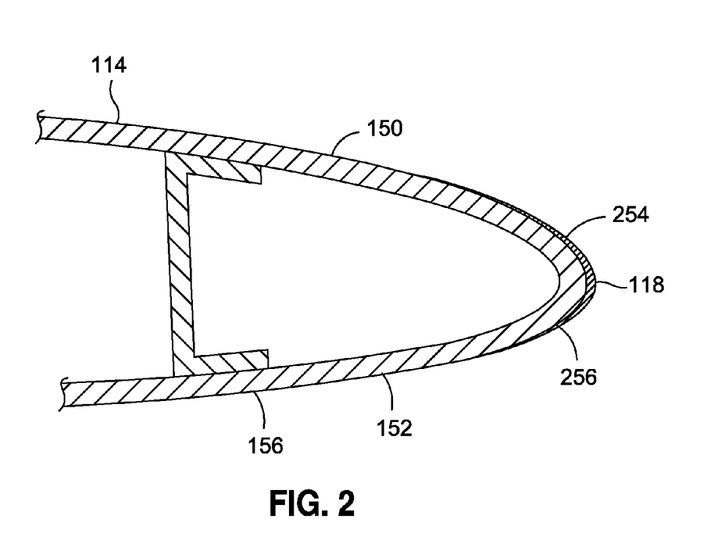
FIG. 2 is a sectional view of a portion of the composite wing taken along line 2 of figure one and illustrating a metallic surface coating applied over a leading edge of a composite wing skin.

Referring to FIG. 2, the aircraft 100 may include one or more composite structures 152 such as the wings 114 which may be formed of composite materials 156. For example, each wing 114 may be comprised of composite skin panels and may include internal stiffeners such as spars and/or ribs which may also be formed of composite material 156 and which may increase the strength and stiffness of the wing 114 and maintain the aerodynamic shape of the wing 114. Advantageously, one or more composite structures 152 of the aircraft 100 may be provided with a surface coating 256 such as the surface coating 256 that may be applied to the leading edge 118 of the wing 114 or wing tip device 116 as shown in FIG. 2.

As shown in FIGS. 3-8 and described below, the surface coating 256 may be formed over the composite structure 152 using an in-mold coating process or method as disclosed herein wherein a surface coating 256 may be applied as a thermal spray onto at least a portion of a tool surface 302 of a tool 300 that may be configured for curing the composite structure 152. After thermally spraying the coating on the tool surface 302, composite material 156 may be applied over the surface coating 256 as part of a regular process for laying up composite material 156. The composite material 156 may be cured to form a cured composite article 150.

Advantageously, the surface coating 256 is applied to the tool 300 in a manner such that the surface coating 256 releases from the tool surface 302 and is retained with the cured composite article 150 when the cured composite article 150 is removed from the tool 300. The release of the surface coating 256 from the tool surface 302 is achieved by forming the surface coating 256 with a net residual stress 250 that is substantially equivalent in magnitude to the tool-coating adhesion strength 224 between the surface coating 256 and the tool surface 302. In this manner, the surface coating 256 may remain adhered to the tool surface 302 during the application (e.g., laying up) of the composite material 156, and the surface coating 256 releases from the tool surface 302 and may be retained with the cured composite article 150 when the cured composite article 150 is removed from the tool 300, as described in greater detail below.

The in-mold coating process may be implemented for applying surface coatings 256 of a variety of materials onto a composite structure 152. For example, the in-mold coating process may be implemented for applying a metallic surface coating 256 to a composite structure 152. In addition, the in-mold coating process disclosed herein may be implemented for applying a ceramic surface coating 256 to a composite article 150, or for applying a variety of alternative coating materials. Furthermore, the in-mold coating process may be implemented for applying a surface coating 256 to any type of structure 152, without limitation, and is not limited to aircraft structures.

Figure 3:
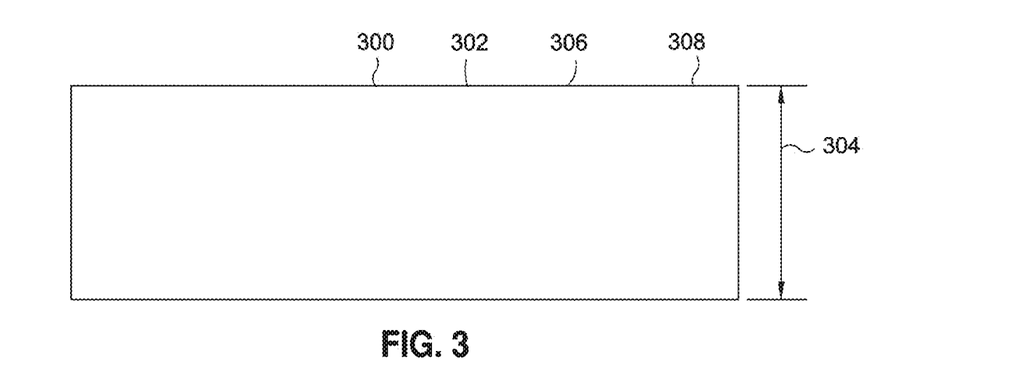
FIG. 3 is a schematic side view of a tool having a tool surface over which a surface coating may be applied during an in-situ process for in-mold metallization of a composite article.
Figure 11:
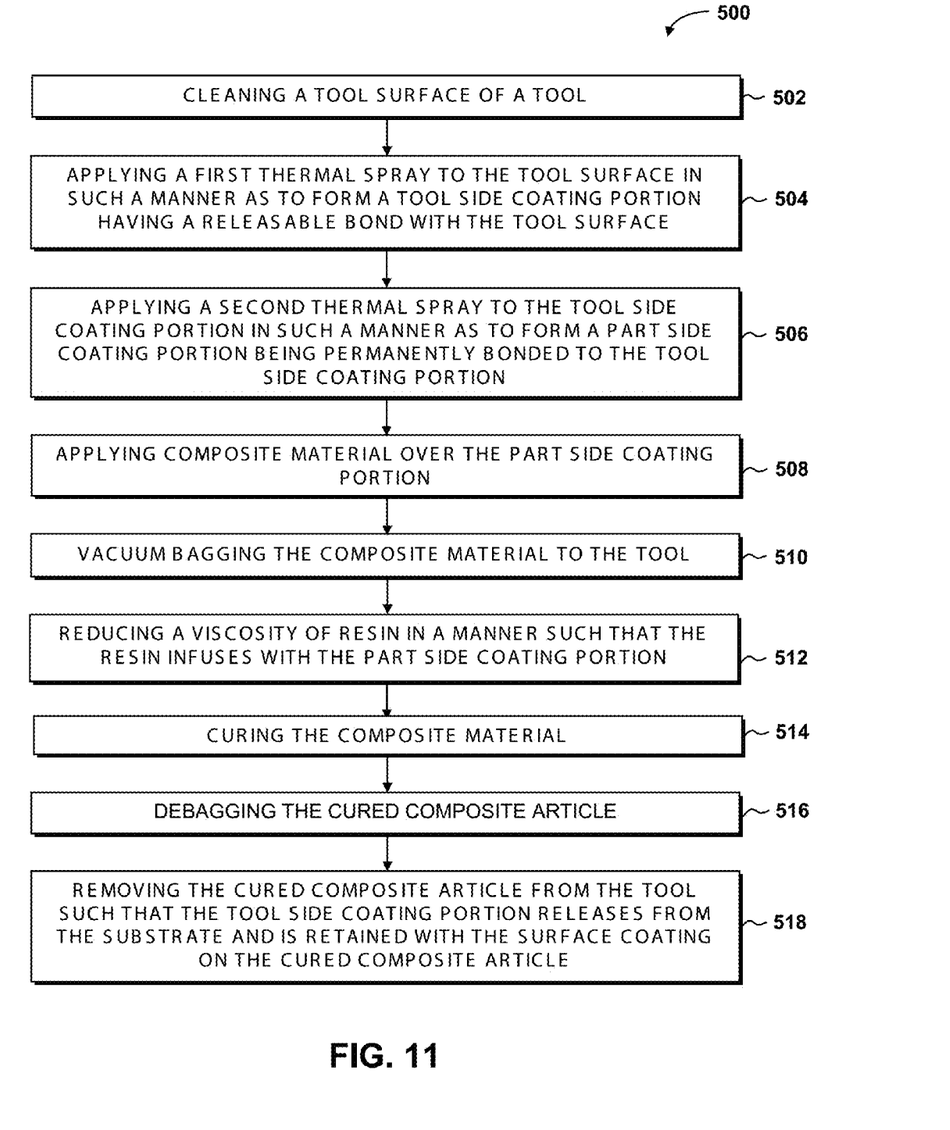
FIG. 11 is a flow diagram having one or more operations that may be included in a method for forming a tube portion.

Referring to FIG. 3 with additional reference to the flow diagram of FIG. 11 describing a method 500 of forming a surface coating 256, shown in FIG. 3 is a schematic side view of a tool 300 which may be configured for curing a composite article 150. The tool 300 shown in FIG. 3 is representative of any one of a variety of different sizes, shapes, contours, and configurations of tools that may be used for curing and/or consolidating composite material 156 such as a composite layup to form a cured composite article 150. The tool 300 may be formed of a material compatible with curing and/or consolidating composite material 156. For example, the tool 300 may be formed of an iron-based material such as Invar™ or steel, or the tool 300 may be formed of aluminum, or any other material that is thermally compatible with curing composite material 156.

The tool 300 may include a tool surface 302 over which the surface coating 256 may be applied. The tool 300 may have a tool thickness 304 that may be dictated in part by the magnitude of compaction pressure that may be applied on the composite material 156 against the tool surface 302 during consolidation of the composite material 156. However, it should be noted that the method of forming the surface coating 256 disclosed herein is not limited to tool surfaces 302 of a curing or consolidation tool 300. In this regard, the tool surface 302 disclosed herein encompasses any surface, without limitation, over which a coating may be applied followed by application of composite material 156 over the coating. Step 502 of the method 500 (FIG. 11) may include cleaning the tool surface 302 or other surface to remove contaminants such as dirt, debris, fluid, moisture, condensation, oil, and any other surface that may adversely affect the in-mold coating process.

Figure 4:
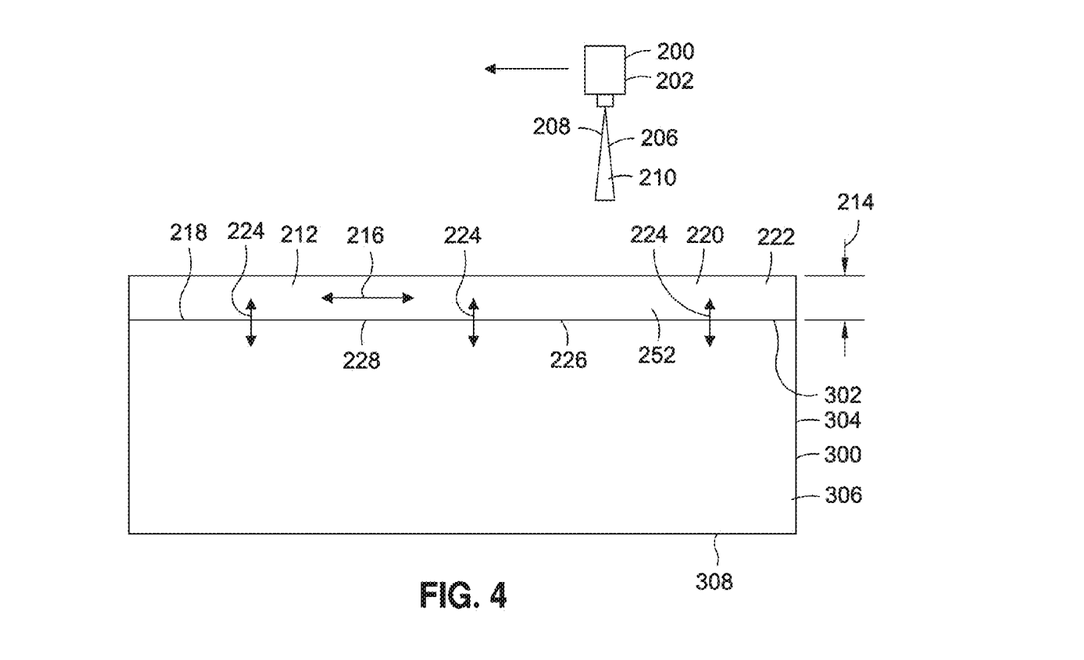
FIG. 4 is a schematic side view of the tool illustrating the application of a first thermal spray to form a tool side coating portion over the tool surface during the in-mold metallization process for forming the surface coating on a composite article.

Referring to FIG. 4, Step 504 of the method 500 (FIG. 11) may include applying a thermal spray to a tool surface 302 to form a surface coating 256 on the tool surface 302. The thermal spray may be applied in a manner such that the surface coating 256 forms a releasable bond 226 with the tool surface 302. As described in greater detail below, after applying the thermal spray to the tool surface 302, composite material 156 may be applied over the surface coating 256 as part of the normal layup process for forming a composite article. The composite material 156 may then be cured on the tool 300 to form a cured composite article 150. Due to the releasable bond 226 between the surface coating 256 and the tool surface 302, the cured composite article 150 may be removed from the tool 300 wherein the surface coating 256 releases from the tool surface 302 and is retained with the cured composite article 150. As a result of the process of applying the thermal spray as described below, the surface coating 256 is formed with a net residual stress 250 that is substantially equivalent in magnitude to a tool-coating adhesion strength 224 which allows for release of the surface coating 256 from the tool surface 302 when the cured composite article 150 is removed from the tool 300.

In an embodiment, the thermal spray may be applied as a single coating to form the surface coating 256 on the tool surface 302. The surface coating 256 may include a tool side coating portion 212 and a part side coating portion 238. The tool side coating portion 212 may be applied in manner forming the releasable bond 226 with the tool surface 302. The part side coating portion 238 may be applied over the tool side coating portion 212. In an embodiment, the thermal spray may be applied such that the tool side coating portion 212 has a relatively smooth surface texture 218 and the part side coating portion 238 has a rougher surface texture 244 than the tool side coating portion 212. The rough surface texture 244 may promote bonding of the composite material 156 to the part side coating portion 238 due to resin 162 from the composite material 156 infusing with the rough surface texture 244 of the part side coating portion 238 as described below.

In an embodiment, the thermal spray may also be applied as a first thermal spray 206 and a second thermal spray 236. The first thermal spray 206 may be applied to the tool surface 302 to form the part side coating portion 238 on the tool surface 302. The part side coating portion 238 may be applied using a thermal spray device 200 as shown in FIG. 4. In an embodiment, the thermal spray device 200 may be configured as a high-velocity oxy-fuel 202 device. The high-velocity oxy-fuel 202 device may emit a plume of spray particles 208 with plume parameters of a relatively low spray temperature 210 and/or a relatively high velocity of the spray particles 208. For example, the plume parameters of the thermal spray device 200 may be such that the first thermal spray 206 is applied at a temperature of between approximately 600-1400 degrees Celsius and at a particle velocity of between approximately 300-700 meters/second (m/s) although the first thermal spray 206 may be sprayed at temperatures and velocities outside of the above-mentioned ranges.

By applying the first thermal spray 206 at a relatively high velocity, the part side coating portion 238 may have a smooth surface texture 218 relative to the tool side coating portion 212 as described below. In addition, the part side coating portion 238 may have a lower porosity 220 than the tool side coating portion 212 which may increase the strength and durability of the surface coating 256. The method may additionally include forming the tool side coating portion 212 with a density 222 that is greater than the density 248 of the part side coating portion 238. In this regard, the plume of the first thermal spray 206 may include spray particles 208 such as metal particles that may have a density 222 that is greater than the density 248 of the spray particles 208 in the second thermal spray 236. The higher density 222 may provide the tool side coating portion 212 with a higher strength, durability, and resistance to mechanical impact than the part side coating portion 238.

The lower surface roughness 218, lower porosity 220, and higher density 222 of the tool side coating portion 212 relative to the part side coating portion 238 may enhance the resistance of the tool side coating portion 212 to mechanical effects such as erosion. In addition, the lower porosity 220, and higher density 222 of the tool side coating portion 212 relative to the part side coating portion 238 may improve the capability of the surface coating 256 to dissipate electrical energy such as from a lightning strike on the composite structure to which the surface coating 256 may be applied. In this regard, the surface coating 256 may be applied to the composite surface of an aircraft structure such as to one or more surfaces of a fuselage (not shown) or wing (not shown) for dissipating electrical energy such as from a lightning strike.

In FIG. 4, in an embodiment, the tool side coating portion 212 may be formed at a relatively small thickness 214. For example, the tool side coating portion 212 may be formed at a thickness 214 of between approximately 0.0005 and 0.10 inch. In an embodiment, the tool side coating portion 212 may be formed at a thickness 214 of between approximately 0.003 and 0.050 inch. However, the tool side coating portion 212 may be formed at thicknesses outside of the 0.0005-0.10 inch range. The thickness 214 of the tool side coating portion 212 is preferably minimized to minimize the overall weight of the surface coating 256 in consideration of the higher density 222 of the tool side coating portion 212 relative to the lower density 248 of the part side coating portion 238. The smooth surface texture 218 of the tool side coating portion 212 relative to the part side coating portion 238 may enhance the aerodynamics of the outer surface of the surface coating 256 and may minimize disruptions in airflow over the surface coating 256 when applied to an aerodynamic surface.

As indicated above, the thermal spray device 200 for applying the first thermal spray 206 is not limited to a high-velocity oxy-fuel device 202. In this regard, the thermal spray device 200 may be provided in any one of a variety of alternative spray device configurations including, but not limited to, a wire arc device such as a twin-wire arc device 204 of the type that may be implemented for applying the second thermal spray 236 as described below. The first thermal spray 206 may also be applied using a plasma spray device (not shown) or other thermal spray devices, and is not limited to application using a high-velocity oxy-fuel 202 device.

In FIG. 4, the tool surface 302 and the tool side coating portion 212 may define a tool-coating interface 228. The first thermal spray 206 may include spray particles 208 that are formed of a material and applied to the tool surface 302 at a temperature and velocity that results in a tool-coating adhesion strength 224 at the tool-coating interface 228. The tool-coating adhesion strength 224 may be such that the tool side coating portion 212 remains adhered to the tool surface 302 during lay-up of the composite material 156, and releases from the tool surface 302 during removal of the cured composite article 150 from the tool 300 without the damage to the composite article 150 (e.g., without delamination, peeling, fiber damage, etc.). In an embodiment, the tool-coating adhesion strength 224 at the tool-coating interface 228 may be less than the bond at a part-coating interface 232 as discussed below. In addition, the tool-coating adhesion strength 224 at the tool-coating interface 228 may be less than a bond strength (e.g., interlaminar bond strength) between composite plies 154 (FIG. 8) of the composite material 156 (FIG. 8) to avoid delamination of the composite plies 154.

Figure 5:
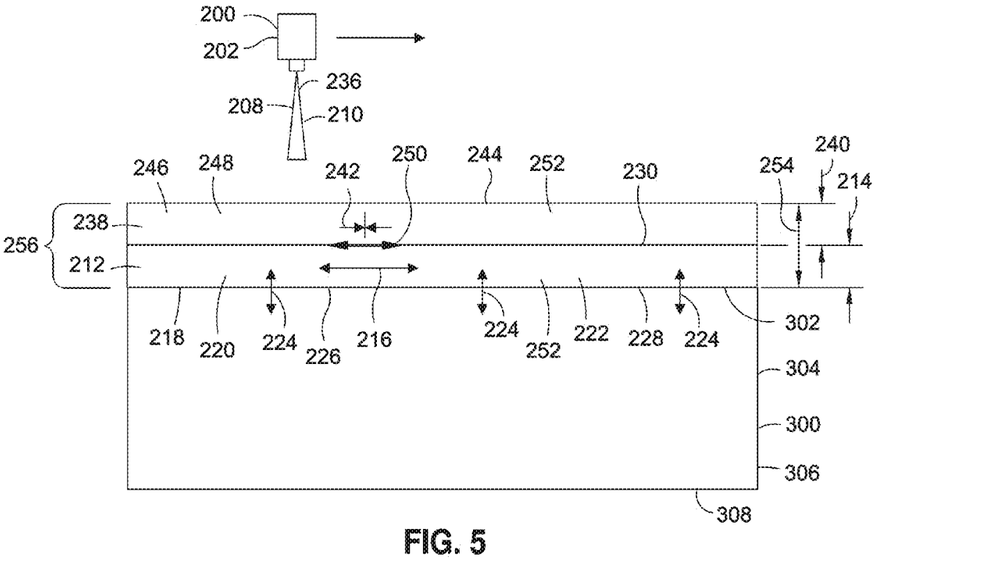
FIG. 5 is a schematic side view of the tool illustrating the application of a second thermal spray to form a part side coating portion over the tool side coating portion during the in-mold metallization process for forming the surface coating on a composite article.

Referring to FIG. 5, Step 506 of the method 500 (FIG. 11) may include applying a second thermal spray 236 to the tool side coating portion 212 to form a part side coating portion 238. As indicated above, the surface coating 256 may be formed by thermal spraying a single coating onto the tool surface 302 such that the tool side coating portion 212 has a relatively smooth surface texture 218, and the part side coating portion 238 has a rougher surface texture 244 to adhere to the composite material 156 as described below. However, the surface coating 256 may also be formed by applying a second thermal spray 236 over a first thermal spray 206. In this regard, the surface coating 256 may be applied to the tool side coating portion 212 after applying the first thermal spray 206 to the tool surface 302. The method may include forming the part side coating portion 238 with a surface texture 244 that is rougher than the surface texture 218 of the tool side coating portion 212 to promote adhesion to the resin 162 of the composite material 156. The part side coating portion 238 may also be applied with a porosity 246 that may be greater than the porosity 220 of the tool side coating portion 212 to reduce the weight of the part side coating portion 238.

The second thermal spray 236 may be applied in a manner such that the part side coating portion 238 is permanently bonded to the tool side coating portion 212. The second thermal spray 236 may be applied using a thermal spray device 200 such as a twin-wire arc 204 device. The thermal spray device 200 may have plume parameters that affect the temperature, velocity, and other parameters of the plume of spray particles 208 emitted by the thermal spray device. For example, such plume parameters may include the type of fuel, oxidizer, and powder carrier gas for emitting the spray particles 208 from the thermal spray device 200. The plume parameters may allow for applying the second thermal spray 236 at a relatively high spray temperature 210 and at a relatively low velocity. For example, the thermal spray device 200 may have plume parameters that allow for spraying the second thermal spray 236 at a temperature of between approximately 1000-3500 degrees Celsius and a particle velocity of between approximately 50-600 m/s although the second thermal spray 236 may be sprayed at temperatures and velocities outside of the above-mentioned ranges. The second thermal spray 236 may also be applied using a plasma device (not shown) and/or a high-velocity oxy-fuel 202 device, and is not limited to a wire arc device 204.

Advantageously, the relatively high spray temperature 210 and relatively low velocity of the second thermal spray 236 may result in the part side coating portion 238 having a lower density 248, higher porosity 246, and rougher surface texture 244 than the tool side coating portion 212. In this regard, the part side coating portion 238 may have an exposed surface having a surface texture 244 that is rougher than the surface texture 218 of the tool side coating portion 212. The higher porosity 246 of the part side coating portion 238 may reduce the overall weight of the part side coating portion 238. In addition, the higher porosity 246 of the part side coating portion 238 may facilitate bonding of the part side coating portion 238 with the composite material 156 as described below. In addition, the part side coating portion 238 may advantageously be formed with a lower density 248 than the tool side coating portion 212 considering that the part side coating portion 238 is unexposed to the environmental effects (e.g., erosion) to which the tool side coating portion 212 is exposed. The lower density 248 of the part side coating portion 238 may minimize the overall weight of the surface coating 256.

In FIG. 5, in an embodiment, the part side coating portion 238 may be formed at a thickness 240 within the same range as the tool side coating portion 212. For example, the part side coating portion 238 may be formed at a thickness 240 of between approximately 0.0005 and 0.10 inch, such as in a thickness of between approximately 0.003-0.015 inch. However, as indicated above with regard to the tool side coating portion 212, the part side coating portion 238 may be formed at a thickness 240 outside of the 0.0005 to 0.10 inch range. The part side coating portion 238 may be thicker than the tool side coating portion 212 because the part tool side coating portion 238 may have has a higher porosity 246 and a lower density 248 than the tool side coating portion 212 as mentioned above. The combination of the tool side coating portion 212 and the part side coating portion 238 defines the surface coating thickness 254. In this regard, the surface coating 256 may be provided in any range of thicknesses up to approximately 0.25 inch or greater. The surface coating thickness 254 may be controlled to within approximately 0.0005 inch which may advantageously allow for tapering the coating thickness such as over a leading edge 118 of a wing skin as illustrated in FIG. 2 or over a wing surface (not shown) such as for lightning protection.

In FIG. 5, the part side coating portion 238 and the tool side coating portion 212 may define a coating-coating interface 230 having an adhesion strength that is greater than the tool-coating adhesion strength 224 at the tool-coating interface 228 and greater than the adhesion strength at the part-coating interface 232. In this regard, the part side coating portion 238 may form a non-releasable bond 234 with the tool side coating portion 212. The part side coating portion 238 and the tool side coating portion 212 may be formed of substantially similar materials. However, part side coating portion 238 and the tool side coating portion 212 may be formed of different materials that are complementary to one another. In FIG. 5, the tool side coating portion 212 and the part side coating portion 238 collectively form the surface coating 256.

Figure 6:
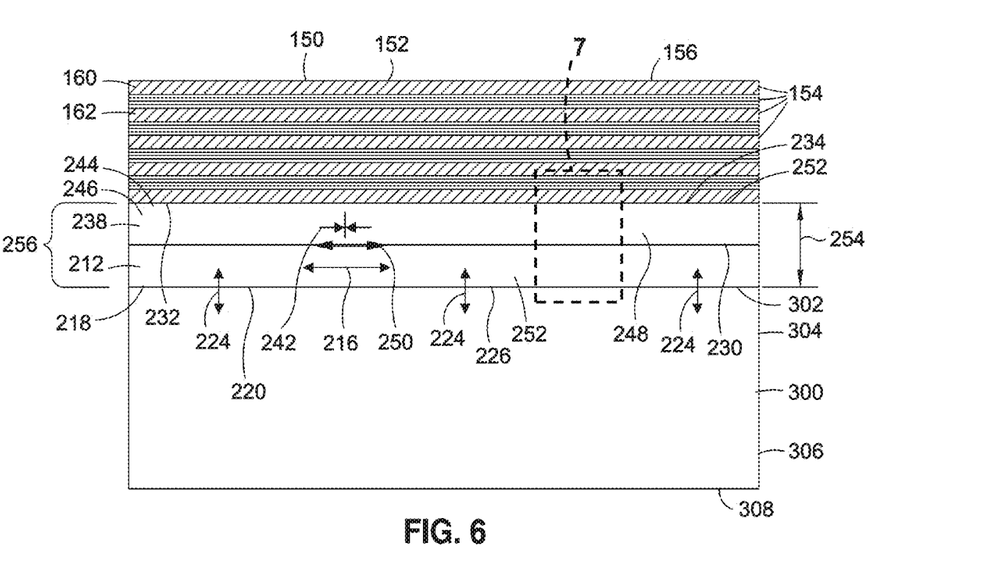
FIG. 6 is a schematic side view of the application of composite material over the part side coating portion during the in-mold metallization process for forming the surface coating on a composite article.

Referring to FIG. 6, Step 508 of the method 500 (FIG. 11) may include applying composite material 156 over the part side coating portion 238 after applying the part side coating portion 238 to the tool side coating portion 212. The application of composite material 156 over the part side coating portion 238 may comprise laying up composite plies 154 of fiber-reinforced material such as fabric that may be pre-impregnated with the matrix material (i.e., pre-preg) or resin 162 material such as a thermosetting epoxy resin matrix or a thermoplastic matrix. The fiber reinforcement 160 may be provided in any one of a variety of different configurations including, but not limited to, woven fabric, unidirectional tape, chopped fibers, and other configurations. The matrix may comprise a thermosetting matrix or a thermoplastic matrix as indicated above.

The composite material 156 is not limited to the use of pre-preg composite material 156 and may include a wet layup process for applying resin 162 to dry fiber reinforced material. For example, application of the composite material 156 over the part side coating portion 238 may include the application of dry fiber reinforced material over the part side coating portion 238 followed by the introduction of matrix or resin material into the dry fiber pre-form using any one of a variety of resin infusion processes including, but not limited to, resin film infusion (RFI), resin transfer molding (RTM), and other wet lay up processes.

In FIG. 6, the composite material 156 and the part side coating portion 238 may define a part-coating interface 232 wherein the composite material 156 and the part side coating portion 238 may become permanently bonded during curing of the composite material 156 as described below. Curing of the composite material 156 may include Step 510 of the method 500 (FIG. 11) comprising vacuum bagging (not shown) the composite material 156. During the vacuum bagging operation, a release layer, a breather layer, other consumable materials, and the vacuum bag (not shown) may be applied over the composite material 156 to seal the composite material 156 to the tool surface 302. A vacuum may be drawn on the vacuum bag to allow for the application of compaction pressure (not shown) on the composite material 156 against the tool surface 302.

In FIG. 6, Step 512 of the method 500 (FIG. 11) may include reducing a viscosity of resin 162 in a manner such that the resin 162 infuses with the part side coating portion 238. For example, the resin 162 viscosity of the composite material 156 may be reduced by elevating the temperature of the resin 162 by any one of a variety of means. For example, the tool 300 may be positioned in an autoclave or a convection oven to elevate the temperature of the resin 162 and reduce the viscosity thereof. Alternatively, the resin 162 may be selectively heated using radiation heating. For thermoplastic resin 162, the viscosity may be reduced by increasing the temperature of the resin 162 above the glass transition temperature. By reducing the viscosity of the resin 162, the resin 162 may flow, infuse, and/or intermingle with the part side coating portion 238.

In FIG. 6, Step 514 of the method 500 (FIG. 11) may include curing the composite material 156 to produce a cured composite article 150. The curing of the composite material 156 may result in a non-releasable bond 234 or a permanent bond between the part side coating portion 238 and the resin 162 of the cured composite article 150 at the part-coating interface 232. Curing of the composite article 150 may be effected by maintaining the composite material 156 at a predetermined temperature and a predetermined pressure for a predetermined period of time to allow for consolidation of the composite material 156. The temperature may then be reduced such as to room temperature to produce the cured composite article 150. The resin 162 may harden or solidify at the part-coating interface 232 resulting in a permanent bond with the part side coating portion 238. In FIG. 6, Step 516 of the method 500 (FIG. 11) may include debagging the cured composite article 150 by removing the vacuum bag (not shown) and/or consumable materials (not shown) such as any release layer and/or breather layer.

Figure 7:
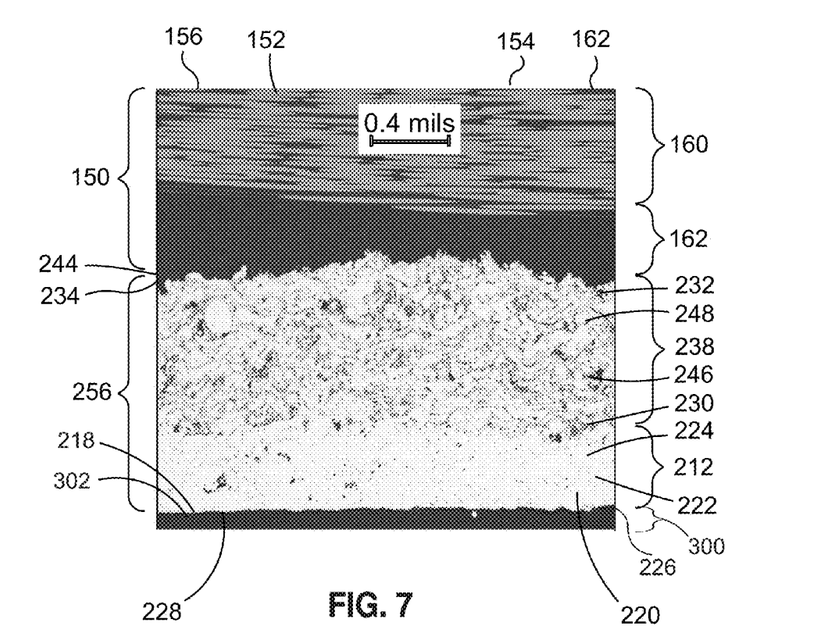
FIG. 7 is a cross sectional illustration of the surface coating comprising a dense, smooth tool side coating portion releasably adhered to the tool surface and the porous part side coating portion having a relatively rough surface texture for bonding with an epoxy resin layer of the composite article.

Referring to FIG. 7, shown is a cross-section of a surface coating 256 between a tool surface 302 and a cured composite article 150. The composite article 150 is shown comprised of carbon fiber reinforcement 160 surrounded by resin 162 material. At the part-coating interface 232, a layer of resin 162 is shown engaged to the part side coating portion 238. As can be seen, the part side coating portion 238 has a highly porous 246 composition and a relatively rough surface texture 244 due to the relatively high temperature and low velocity of spray particles 208 emitted by a twin-wire arc 204 thermal spray device 200. The relatively rough surface texture 244 of the part side coating portion 238 may facilitate the infusing and bonding of the resin 162 of the composite material 156 with the part side coating portion 238. The relatively high porosity 246 may reduce the overall weight of the surface coating 256 and may also facilitate the bonding of the resin 162 to the part side coating portion 238.

In FIG. 7, the tool side coating portion 212 is shown having a relatively dense composition and a relatively smooth surface texture 218 due to the high velocity and relatively low temperature of spray particles 208 emitted by a high-velocity oxy-fuel 202 thermal spray device 200 as indicated above. The relatively smooth, dense, and low porosity composition of the tool side coating portion 212 may facilitate the releasable adhesion of the tool side coating portion 212 with the tool surface 302. The combination of the thickness 240 of the part side coating portion 238 and the tool side coating portion 212 makes up the total thickness of the surface coating 256.

Referring to FIG. 6, Step 518 of the method 500 (FIG. 11) may include removing the cured composite article 150 from the tool 300. In an embodiment, the cured composite article 150 may be removed from the tool 300 by applying an external force 310 on the cured composite article 150 such as an axial force to draw the cured composite article 150 away from the tool surface 302. However, the cured composite article 150 may also be removed by applying a peeling force at an edge (not shown) of the surface coating 256. The cured composite article 150 may also be removed from the tool 300 by applying a lateral force generally parallel to the tool surface 302 such as a sliding force to slide the cured composite article 150 off of the tool surface 302. In this regard, removal of the cured composite article 150 may be facilitated by any external force 310 that causes the tool side coating portion 212 to release from the tooling surface and such that the tool side coating portion 212 is retained with the surface coating 256 on the cured composite article 150.

As indicated above, the ability of the surface coating 256 to remain releasably adhered to the tool surface 302 during the application of composite material 156 over the surface coating 256, and release from the tool surface 302 under an external force 310 (e.g., peeling up from a corner or edge) applied to the cured composite article 150 may be achieved by forming the surface coating 256 with a net residual stress 250 that is substantially equivalent in magnitude to the tool-coating adhesion strength 224 between the surface coating 256 and the tool surface 302 at the tool-coating interface 228. In this regard, the surface coating 256 may have with a net residual stress 250 that is a resultant of the residual stress 216 in the tool side coating portion 212 and the residual stress 242 in the part side coating portion 238.

In a further embodiment, the method may include forming the surface coating 256 in consideration of layup stress 164 that may be generated in the cured composite article 150. For example, the resin 162 and the fiber reinforcement 160 of the composite material 156 may have different CTEs that may result in residual layup stress 164 in the cured composite article 150 upon cooling from the curing temperature to ambient or room temperature. The first thermal spray 206 and the second thermal spray 236 may be applied in a manner causing the forming of the surface coating 256 with a net residual stress 250 that substantially balances the layup stress 164 in the cured composite article 150 such that the net residual stress 250 in the surface coating 256 is substantially equivalent in magnitude to the tool-coating adhesion strength 224.

Figure 8:
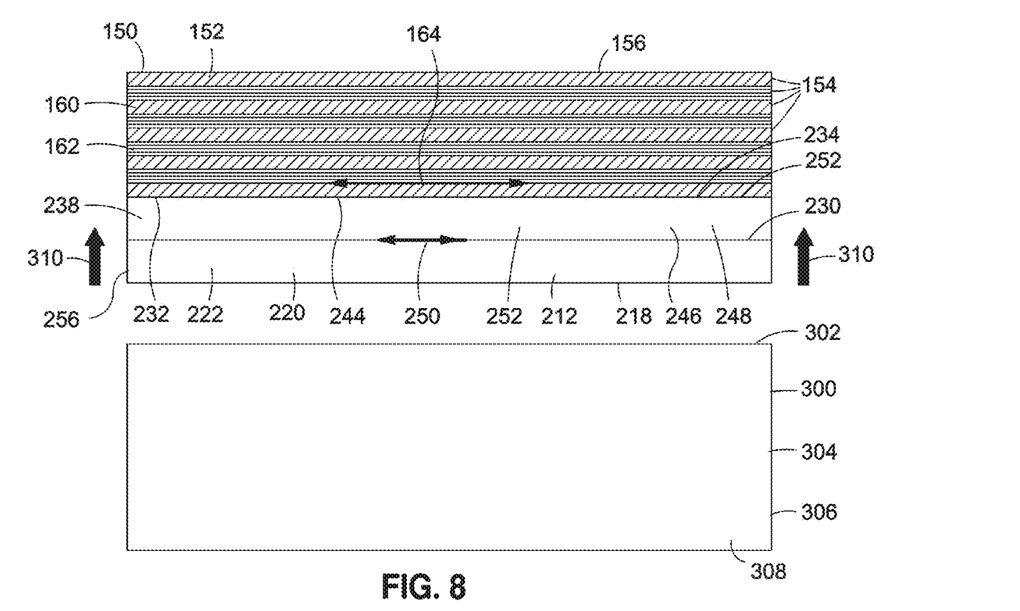
FIG. 8 is a schematic side view of the removal of the cured composite article from the tool and a manner such that the tool side coating portion releases from the tool surface and is retained with the part side coating portion on the cured composite article.

Referring to FIGS. 9A-9D, shown is a schematic diagram of an embodiment of a system for determining residual stress in a coating 422 applied to a substrate 402 by thermal spraying. The system may provide a means for assessing the effect of different process parameters on the magnitude and direction (i.e., compressive, tensile) of residual stress in a coating 422 such as the net residual stress 250 in the surface coating 256 (FIG. 5), whether applied as a single thermal spray, or applied as a first thermal spray 206 (FIG. 4) and a second thermal spray 236 (FIG. 5). In this regard, the system may provide a means for determining the thermal spraying process parameters that may be incorporated into a single thermal spray, or process parameters that may be incorporated into a first thermal spray 206 (FIG. 4) and/or a second thermal spray 236 (FIG. 5), in order to achieve a desired residual stress (FIG. 8) in the surface coating 256 (FIG. 8) on a cured composite article 150 (FIG. 8).

Such process parameters may include, but are not limited to, spray parameters and tool characteristics. Spray parameters may include plume parameters associated with the thermal spray device and may include the type of fuel, oxidizer, and powder carrier gas associated with the plume emitted by the thermal spray device. Spray parameters may also include feedstock characteristics of a feedstock introduced into the plume or jet emitted by the thermal spray device. Such feedstock characteristics may include feedstock material, the material CTE, the powder size distribution, powder morphology, and a variety of other feedstock characteristics that may affect the in-flight spray velocity and/or the spray temperature of the plume of spray particles 208. The coating thickness 254 may represent a parameter that may affect the magnitude and direction of the residual stress in the coating. As indicated above, the process parameters may also include tool characteristics such as the tool material, the tool coefficient of thermal expansion (CTE) 308, the tool surface finish, the tool thickness 304, the tool temperature 306, and other tool characteristics which may have an affect on the residual stress (FIG. 8) in the surface coating 256 (FIG. 8)

Referring to FIG. 6, the surface coating 256 may be applied to the tool 300 using a predetermined set of process parameters that result in a residual stress 216 of a desired magnitude and desired direction in the surface coating 256. Whether applied as a single thermal spray or as a combination of a first thermal spray, a second thermal spray, and/or additional thermal sprays, the surface coating 256 may be applied using a predetermined set of process parameters such that residual stress 216 of a desired magnitude and desired direction is formed in the tool side coating portion 212. Likewise, the part side coating portion 238 may be applied to the tool side coating portion 212 using a predetermined set of process parameters to achieve a desired magnitude and direction of residual stress 242 in the part side coating portion 238. The net residual stress 250 in the surface coating 256 is a resultant of the residual stress 242 in the part side coating portion 238 and the residual stress 216 in the tool side coating portion 212. The process parameters for the tool side coating portion 212 and part side coating portion 238 may be adjusted until the magnitude and direction of the residual stress 216 in the tool side coating portion 212 counteracts or balances the residual stress 242 in the part side coating portion 238 by an amount causing the net residual stress 250 to be substantially equivalent to the adhesion strength 224. For example, for a given tool configuration (e.g., tool shape), it may be desirable to form the surface coating 256 on a tool surface 302 with a net residual stress 250 that is predominantly compressive to facilitate removal of the cured composite article 150 from the tool 300. In this regard, the thermal spraying process parameters may be adjusted until a set of parameters are determined that result in the net residual stress 250 being predominately compressive.

Figure 9A:
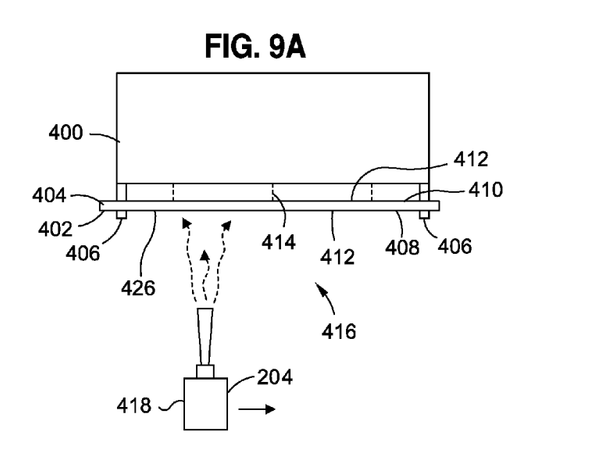
FIG. 9A is a schematic top view of a curvature measuring instrument during a preheating stage and wherein the curvature measuring instrument includes a substrate over which a coating may be applied for measuring process parameters as may be used in calculating residual stress in the coating.

In FIG. 9A, the system for assessing thermal spraying process parameters is shown as a curvature measuring device 400 and may be implemented for determining residual stress in a coating 422 using a process disclosed in U.S. Pat. No. 6,478,875 issued to Sampath et al. on Nov. 12, 2002, the entire content of which is incorporated by reference herein. The curvature measuring device 400 may include a substrate 402 that may be mounted at opposing ends by a pair of substrate supports 406. The substrate 402 may have a front substrate surface 408 and a back substrate surface 410 collectively defining a substrate thickness. The substrate 402 may comprise a generally elongated and straight member which, in an embodiment, may be formed of the same material from which the tool 300 may be formed. The substrate 402 may have a substrate CTE 404. One or more laser devices may emit laser beams 414 for detecting displacement at one or more points along the substrate 402 as a means for calculating the curvature of the substrate 438 and the coating thickness 254 at different times during the coating process.

In FIG. 9A, thermal sensors 412 may be mounted on the front substrate surface 408 and on the back substrate surface 410 for measuring the substrate 402 temperature and for measuring the coating temperature 436. A thermal spray device 418 may emit a thermal spray of spray particles 420 in a back-and-forth motion to form the coating 422 along the front substrate surface 408. In the embodiment shown in FIGS. 9A-9D, the thermal spray device 418 may be configured as a twin-wire arc 204 spray device 418 for emitting spray articles at relatively low velocity and relatively high temperature as described above. However, the system may employ any type of thermal spray device.

Figure 10A:
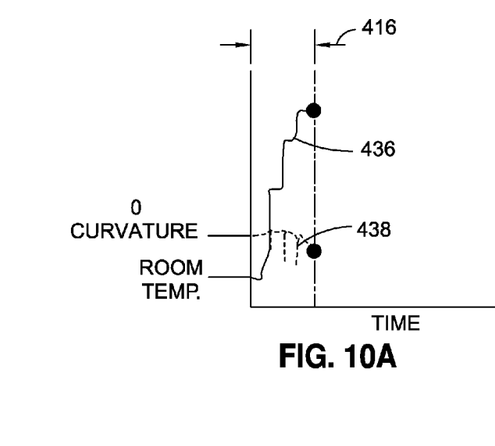
FIG. 10A is a graph plotting substrate curvature and coating temperature over time during the preheating stage.

Referring to FIG. 9A, shown is a preheating stage 416 wherein the uncoated substrate 402 may be heated for stress relief of the substrate 402 from residual stress as may result from grit blasting during cleaning of the substrate 402. The substrate 402 may be preheated such as by using a torch or by using the thermal spray device 418 without emitting spray articles. During preheating, the substrate 402 may undergo initial curvature 426 due to the stress relief FIG. 10A is a graph plotting the curvature of the substrate 438 and the coating temperature 436 during the preheating stage 416. The substrate 402 starts off with a generally straight configuration and may assume a slight curvature as the temperature of the substrate 402 increases as shown in FIG. 10A.

Figure 9B:
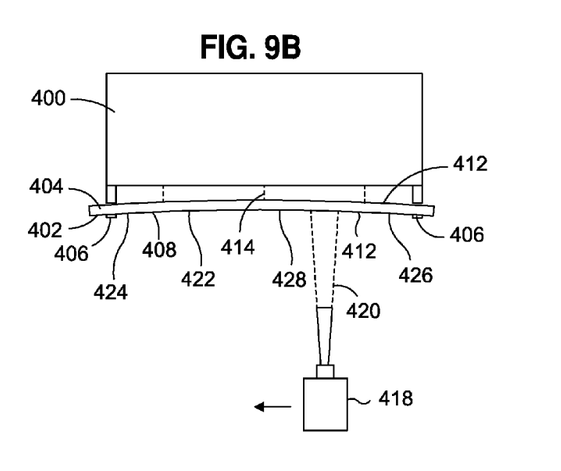
FIG. 9B is a schematic top view of the curvature measuring instrument during an initial adhesion pass by a thermal spray device to apply an initial layer of the coating over the substrate.

FIG. 9B illustrates the curvature measuring instrument during an initial adhesion pass 428 comprising spraying or depositing the coating 422 over the front substrate surface 408 using the thermal spray device 418. The thermal spray device 418 may emit spray articles to form the initial layer of the coating 422. The quenching of the relatively high temperature spray particles 420 on the relatively cooler front substrate surface 408 results in the curvature of the substrate 438. The process includes using the above-mentioned laser devices to measure the change in curvature of the substrate 438 in response to spraying the coating 422 on the substrate 402 mentioned above.

Figure 10B:
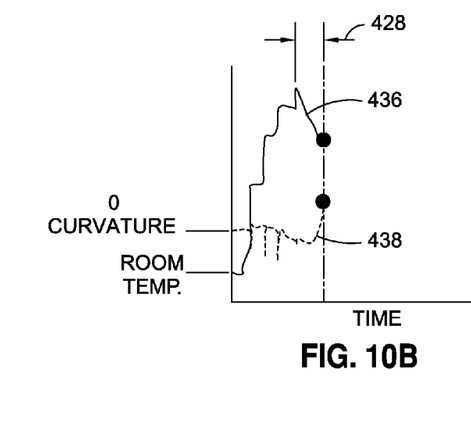
FIG. 10B is a graph plotting substrate curvature and coating temperature over time during the initial adhesion pass.

FIG. 10B is a graph plotting the curvature of the substrate 438 and the coating temperature 436 during the initial adhesion pass 428. The plot graphically illustrates the increase in the curvature of the substrate 438 as a result of compressive residual stress in the coating 422 during the initial adhesion pass.

Figure 9C:
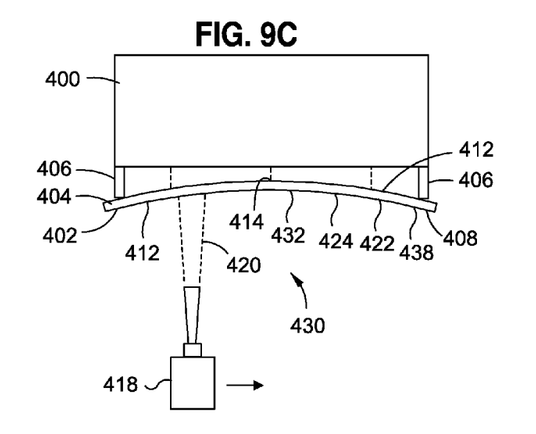
FIG. 9C is a schematic top view of the curvature measuring instrument illustrating an evolving residual stress in the coating during the application of subsequent layers of the coating.

FIG. 9C shows the increasing curvature of the substrate 402 during an evolving residual stress 430 stage of the coating 422 during the deposition process due to the continued application of the thermal spray onto the substrate 402. The curvature of the substrate 402 in FIG. 9C may be representative of a quenching effect 432 comprising quenching of the spray particles 420 upon contact with the cooler substrate 402 surface and overcoming a peening effect of the spray particles 420 on the substrate 402 being impacted by additional spray particles 420 that continue to be emitted by the thermal spray device 418.

Figure 10C:
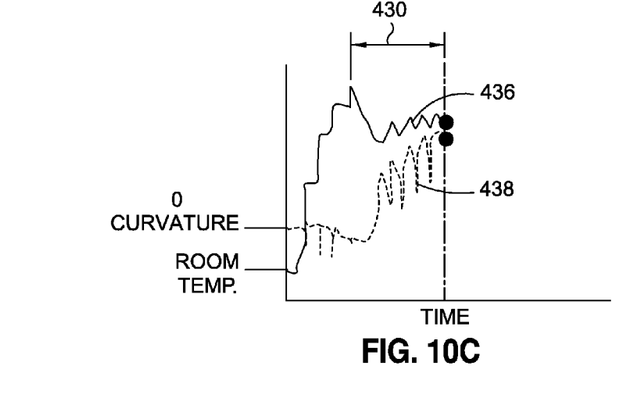
FIG. 10C is a graph plotting substrate curvature and coating temperature over time during the evolving residual stress stage.

FIG. 10C is a graph plotting the curvature of the substrate 438 and the increase in the coating temperature 436 during the evolving residual stress 430 stage. The evolving residual stress 430 occurs in the coating 422 due to the application of additional layers of the coating 422. The curvature of the substrate 438 may be representative of tensile stress buildup in the coating 422 during deposition onto the substrate 438.

Figure 9D:
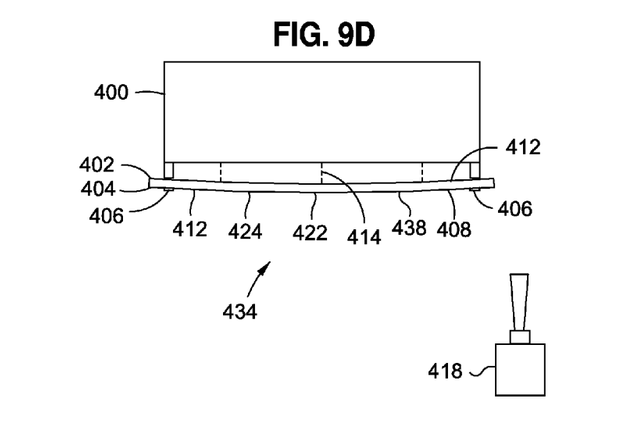
FIG. 9D is a schematic top view of the curvature measuring instrument illustrating a cooling stage or in the substrate and the coating are allowed to cool to room temperature.

FIG. 9D shows the substrate 402 reversing curvature during a cooling stage 434.

In the cooling stage 434, the thermal spray device 418 may be deactivated and the substrate 402 and the coating 422 may be allowed to cool to ambient or room temperature. During the cooling stage 434, measurements are recorded for the displacement of the substrate 402 and the temperature of the coating 422 and the substrate 402.

Figure 10D:
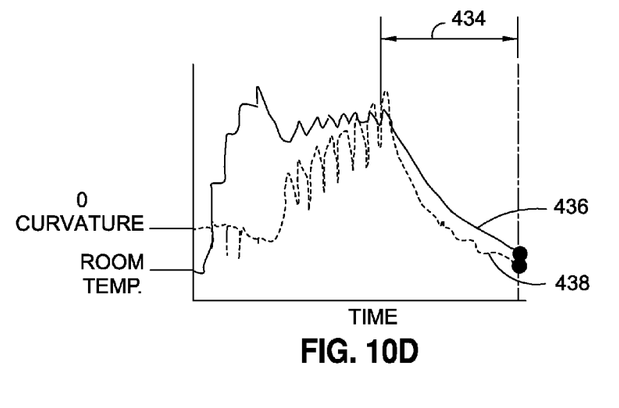
FIG. 10D is a graph plotting substrate curvature and coating temperature over time during the cooling stage.

FIG. 10D is a graph plotting the curvature of the substrate 438 and the decrease in the coating temperature 436 during the cooling stage 434. Due to the mismatch in the coating CTE 424 relative to the substrate CTE 404, cooling of the coating 422 and substrate 402 may result in a reversal of the curvature of the substrate 438. In this regard, FIG. 10D may represent the coating 422 having a compressive residual stress at room temperature.

Using the measurements of curvature of the substrate 438 and the coating temperature 436 as measured by the curvature measuring device 400, the process of determining the residual stress in a coating 422 may include determining the deposition stress in the coating 422 following deposition onto the substrate 438. The deposition stress may occur due to solidification and peening of the coating 422 during deposition. The process may further include determining the thermal stress in the coating 422 during cooling of the coating 422 based on the difference between the coating CTE 424 and the substrate CTE 404. The thermal stress in the coating 422 can be calculated based on changes in the curvature of the substrate 438 with change in temperature as disclosed in the above-referenced U.S. Pat. No. 6,478,875. The process may include determining the elastic modulus of the coating 422 based on the thermal stress. The process may additionally include calculating the residual stress in the coating 422 based on the deposition stress and the thermal stress. In this manner, the process provides a means for calculating the magnitude and the direction (compressive or tensile) of the residual stress in the coating 422.

Based on the coating residual stress as may be determined using the curvature measuring device 400 illustrated in FIGS. 9A-9D and the process disclosed in U.S. Pat. No. 6,478,875, thermal spraying parameters for applying the first thermal spray 206 (FIG. 4) and the second thermal spray 236 (FIG. 5) may be iteratively adjusted until a desired net residual stress 250 is achieved in the final surface coating 256 (FIG. 6). As indicated above, the net residual stress 250 is a resultant of the residual stress 216 in the tool side coating portion 212 and the residual stress 242 in the part side coating portion 238. In this regard, the method of applying the first thermal spray 206 on the tool surface 302 may comprise depositing the first thermal spray 206 based on the tool temperature 306, the tool CTE 308, the coating temperature 436 (e.g., the spray temperature 210), and the coating CTE 252 such that the difference in the coating CTE 252 and the tool CTE 308 causes a strain in the tool side coating portion 212 allowing for releasable adhesion (e.g., non-permanent bonding) and removal of the tool side coating portion 212 from the tool surface 302 without damage to the cured composite article 150 (e.g., without delamination, peeling, etc., of the composite article 150).

Referring to FIG. 6, in an embodiment, the tool side coating portion 212 may have a coating CTE 252 that may be substantially equivalent to the tool CTE 308 to minimize the difference between the net residual stress 250 in the surface coating 256 and the tool-coating adhesion strength 224 between the surface coating 256 and the tool surface 302 at the tool-coating interface 228. The tool-coating adhesion strength 224 at the tool-coating interface 228 may be determined by any one of a variety of different methods. For example, a tension test may be implemented wherein a tensile load may be applied normal to the plane of a coating that may be bonded between a pair of test fixtures (not shown). Alternatively, the magnitude of the tool-coating adhesion strength 224 at the tool-coating interface 228 may be determined by an indentation test or by other methods.

In FIG. 6, the coating material and the tool material may be selected to minimize the CTE mismatch. In an embodiment, the coating CTE 252 and the tool CTE 308 may be minimized to achieve residual stress of a desired direction. For example, by minimizing the CTE mismatch and applying the thermal spray at a relatively high velocity and relatively low temperature, the net residual stress 250 in the surface coating 256 may be predominantly compressive due to peening of the spray particles 208 on the tool surface 302 by other spray particles 208 that the spray device 200 continues to emit. Alternatively, a relatively higher CTE mismatch in combination with applying the thermal spray at a relatively low velocity and a relatively high temperature may result in the net residual stress 250 in the surface coating 256 being predominately tensile. As can be seen, the direction (e.g., compressive or tensile) of the net residual stress 250 may be achieved by adjusting the thermal spraying process and the material parameters.

As indicated above, the surface coating 256 may be formed as a metallic coating on a composite article 150. The metallic coating may comprise any one of a variety of different metals including, but not limited to, Inconel™, tungsten, molybdenum, aluminum, and any one of a variety of other metallic materials, without limitation. Likewise, the surface coating 256 may be formed as a ceramic surface coating 256 such as by using a plasma spray device (not shown) for applying the first thermal spray 206 and/or the second thermal spray 236. In this regard, the surface coating 256 may be formed as a mixture or hybrid of metallic and ceramic materials or any one of a variety of other coating materials.

The above-described method of forming a surface coating 256 may be implemented on composite structures 152 of any size, shape and configuration, without limitation. In an embodiment, the composite structure 152 may comprise any portion of an aircraft structure such as a wing, a wing tip device, a winglet, a leading edge device, a lift enhancement device, a leading edge slat, a Krueger flap, a trailing edge device, a fowler flap, an aileron, a control surface, an elevon, a ruddervator, a stabilizing surface, a fin, a rudder, a rotor blade, or any one of a variety of other composite structures. In an embodiment, the surface coating 256 may be formed on a leading edge 118 (FIG. 2) of a composite structure such as a wing (FIG. 1) of an aircraft (FIG. 1) or other aerodynamic structure such as for erosion protection and/or impact protection. In an embodiment, the surface coating 256 may be formed on portion of any composite surface such as a composite wing for lightning protection and/or for conducting electricity along the composite structure. In this regard, the method disclosed herein may be applied to a composite structure for any vehicular application or for any non-vehicular application, without limitation.

Figure 12:
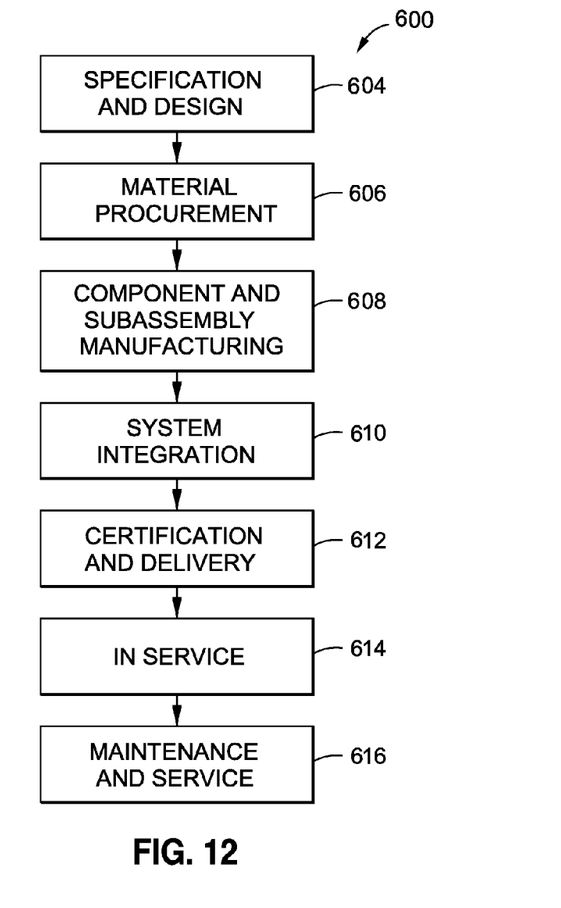
FIG. 12 is a flow diagram of an aircraft service and production method.
Figure 13:
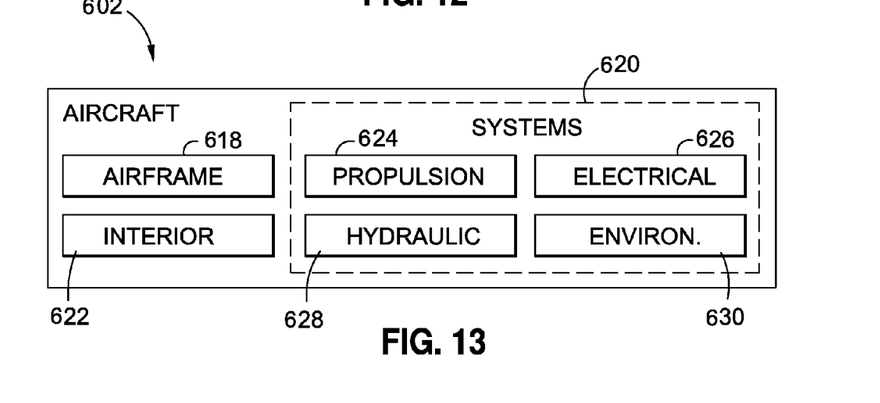
FIG. 13 is a block diagram of an aircraft.

Referring to FIGS. 12-13, embodiments of the disclosure may be described in the context of an aircraft manufacturing and service method 600 and an aircraft 602 as shown in FIG. 13. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on)

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 602 produced by exemplary method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of forming a surface coating on a composite article, comprising the steps of:
    determining parameters of a thermal spray that result in a magnitude of net residual stress in a surface coating being substantially equivalent to a tool-coating adhesion strength;
    applying the thermal spray to a tool surface of a tool in such a manner as to form the surface coating having the net residual stress substantially equivalent to the tool-coating adhesion strength and such that the tool-coating adhesion strength is less than a bond at a part-coating interface between the surface coating and a cured composite article;
    applying composite material over the surface coating;
    curing the composite material to form the cured composite article bonded to the surface coating at the part-coating interface; and
    removing the cured composite article from the tool in a manner that releases the surface coating from the tool surface and retains the surface coating with the cured composite article.

2. The method of claim 1, wherein the step of applying the thermal spray comprises:
    applying a first thermal spray to form a tool side coating portion of the surface coating, the tool side coating portion having a releasable bond with the tool surface; and
    applying a second thermal spray to form a part side coating portion of the surface coating, the composite material being applied over the part side coating portion.

3. The method of claim 2, wherein the step of applying the thermal spray comprises:
    applying the first thermal spray using a high-velocity oxy-fuel device.

4. The method of claim 2, wherein the step of applying the thermal spray comprises:
    applying a second thermal spray using at least one of a plasma spray device, a high-velocity oxy-fuel device, and a twin-wire arc device.

5. The method of claim 2, wherein the surface coating has a net residual stress that is a resultant of the residual stress of the tool side coating portion and the part side coating portion, the steps of applying the first thermal spray and the second thermal spray comprising:
    adjusting at least one process parameter in such a manner that the residual stress in the tool side coating portion counteracts the residual stress in the part side coating portion by an amount causing the net residual stress to be substantially equivalent to the tool-coating adhesion strength.

6. The method of claim 5, wherein the step of adjusting at least one process parameter comprises:
    determining residual stress in at least one of the tool side coating portion and the part side coating portion by performing the following:
        spraying the coating on a substrate;
        measuring a change in curvature of the substrate in response to spraying the coating on the substrate;
        determining a deposition stress in the coating following deposition on the substrate;
        determining a thermal stress in the coating during cooling of the coating based on a difference between a coating coefficient of thermal expansion (CTE) and a substrate CTE;
        calculating the residual stress in the coating based on the deposition stress and the thermal stress; and
        iteratively adjusting the at least one process parameter and calculating the residual stress until the net residual stress is substantially equivalent to the tool-coating adhesion strength.

7. The method of claim 5, wherein the step of adjusting at least one process parameter comprises:
    adjusting the at least one process parameter until the surface coating has a net residual stress that substantially balances a layup stress in the cured composite article and the net residual stress is substantially equivalent in magnitude to the tool-coating adhesion strength.

8. The method of claim 5, wherein the step of adjusting at least one process parameter comprises adjusting at least one of:
    a spray parameter and a tool characteristic.

9. The method of claim 8, wherein the spray parameter comprises at least one of a plume parameter and a feedstock characteristic.

10. The method of claim 8, wherein the tool characteristic comprises at least one of the following: a tool material, a tool CTE, a tool surface finish, a tool thickness, and a tool temperature.

11. The method of claim 1, wherein the step of applying the thermal spray comprises:
    depositing the surface coating at a coating temperature that promotes adhesion to the tool surface in a manner such that the surface coating remains adhered to the tool surface during layup of the composite material and releases from the tool surface during removal of the cured composite article from the tool.

12. The method of claim 1, wherein the step of applying the thermal spray comprises:
    forming the surface coating with a part side coating portion having a surface texture that is rougher than the surface texture of a tool side coating portion of the surface coating.

13. The method of claim 1, wherein the step of applying the thermal spray includes:
    forming the surface coating with a tool side coating portion having a porosity that is less than the porosity of a part side coating portion of the surface coating.

14. The method of claim 1, wherein the step of applying the thermal spray includes:
    forming the surface coating with a tool side coating portion having a density that is greater than the density of a part side coating portion of the surface coating.

15. The method of claim 1, wherein the step of applying the thermal spray includes:
    forming the surface coating with a tool side coating portion and a part side coating portion; and
    at least one of the tool side coating portion and the part side coating portion having a thickness of between approximately 0.0005 and 0.10 inch.

16. The method of claim 1, wherein the surface coating comprises a metallic surface coating.

17. The method of claim 1, wherein the surface coating comprises a ceramic surface coating.

18. The method of claim 17, wherein the step of applying the thermal spray includes:
    applying the thermal spray using a plasma spray device to form the ceramic surface coating.

19. A method of forming a surface coating on a composite article, comprising the steps of:
    applying a first thermal spray to a tool surface of a tool to form a tool side coating portion of a surface coating, the tool side coating portion having a releasable bond with the tool surface;
    determining a magnitude and direction of residual stress in the tool side coating portion;
    applying a second thermal spray over the tool side coating portion to form a part side coating portion having residual stress of a magnitude and direction that counteracts the residual stress in the tool side coating portion by an amount causing a net residual stress in the surface coating to be substantially equivalent to a tool-coating adhesion strength;
    applying composite material over the part side coating portion;
    curing the composite material to form a cured composite article; and
    removing the cured composite article from the tool in a manner that releases the surface coating from the tool surface and retains the surface coating with the cured composite article.

20. The method of claim 19, wherein the surface coating comprises a ceramic surface coating.

21. The method of claim 19, wherein at least one of the steps of applying the first thermal spray and the second thermal spray includes:
    applying at least one of the first thermal spray and the second thermal spray using a plasma spray device.

* * * * *